Jan. 20, 1948.  C. C. HIGGENS  2,434,799
VISCOSITY-RESPONSIVE VALVE
Filed Nov. 10, 1943
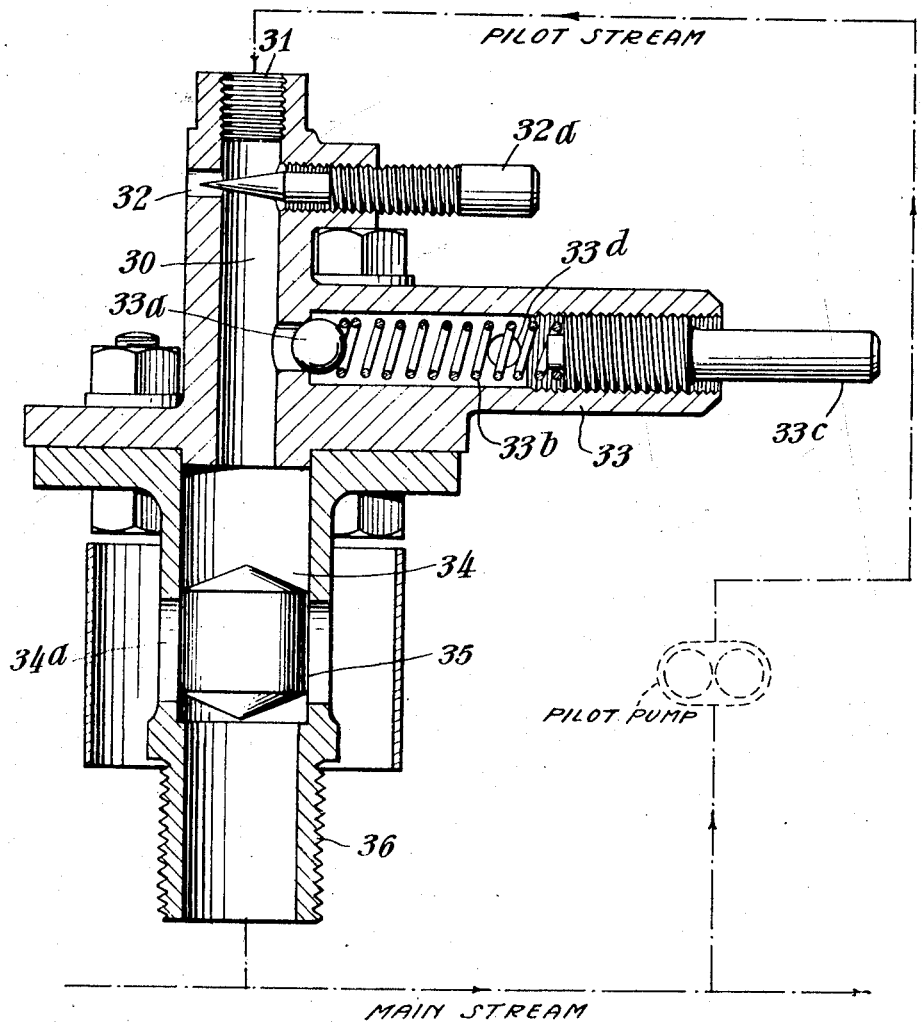
Inventor:
Cecil Cyprian Higgens,
by Pierce & Scheffler,
Attorneys.

Patented Jan. 20, 1948

2,434,799

UNITED STATES PATENT OFFICE 2,434,799

VISCOSITY-RESPONSIVE VALVE

Cecil Cyprian Higgens, London, England, assignor to The Eyre Smelting Company, Limited, London, England, a British company Application November 10, 1943, Serial No. 509,789
In Great Britain June 24, 1943

5 Claims. (Cl. 137—53)

This invention relates to controlling the flow of viscous fluids and the operation of sundry mechanisms by virtue of the viscosity of such fluids. In my application Ser. No. 494,567, filed July 13, 1943, I have described a fluid pressure arrangement for loading automatically a pressure relief valve or other device in sympathy with changes which may occur in the fluid viscosity. The present invention is a modification and improvement of the invention of said application.

The present invention consists of a fluid pressure arrangement in which is provided a pressure chamber into which is connected a constant output pilot pump, free from excesisve cyclical variations. Leading out of this pressure chamber is a flow-restricting orifice which may, if desired, be made adjustable. Fitted into said pressure chamber there may be, if desired, a spring-loaded relief valve the function of which is to limit the pressure rise in the pilot circuit to any convenient value. If no such limitation is necessary, the pilot relief valve is omitted.

Also connected to the pressure chamber is a smooth bore chamber in which is situated a freely-moving piston. This piston may in itself form the moving member of a pressure relief valve or it may contact and operate any suitable alternative mechanisms.

The pilot pump draws from the main stream of fluid, with the viscosity of which the device is concerned, and delivers into the said pressure chamber. If the whole output from the pilot pump passes through the flow-restricting orifice, provided the temperature of the escaping fluid corresponds with that of the fluid in the main stream, a force will be exerted upon the floating piston proportional to the value of the viscosity of the latter fluid.

The invention hereunder described may be used when, for any reason, the temperature of the fluid entering the apparatus from the pilot pump and that of the flow-restricting orifice may be equalized with the temperature of the fluid in the main system without recourse to an immersion chamber. Further, a pressure-limiting relief valve may be included in the pilot circuit should it be advantageous to limit the pressure rise in that circuit to any predetermined value.

Should a relief valve be fitted in the pilot circuit which permits a portion of the pilot stream to by-pass the flow-restricting orifice at high pressures, then the loading of such valve will determine the maximum pressure which can be maintained within the said chamber and, likewise, the maximum force which can be exerted from within the chamber upon the floating piston irrespective of fluid viscosity.

The modified device when arranged to control a pressure relief valve is, for example, suitable for regulating pressure in a fluid system in sympathy with the viscosity of the fluid in that system and of causing to be maintained a substantially constant rate of flow through pipes, conduits and other restrictions which lead out of that system irrespective of changes in viscosity of the fluid.

When a pressure limiting valve is included in the pilot circuit the pressure in the main system can be limited to any desired figure, notwithstanding increases in the value of viscosity of the fluid in that system, and the rate of flow through pipes, conduits and restrictions leading out of the system would be reduced proportionately.

The invention may be used for applications other than that given by way of example.

One form of pressure-regulating device made in accordance with the present invention is illustrated in section in the figure in the accompanying drawing, the piston element of the device being in the operating, i. e., the pressure-regulating position. As illustrated, a pressure chamber 30 is provided with an entry 31 into which is connected the pilot pump delivery. Leading out of chamber 30 is an orifice 32, the effective area of which may be adjusted by means of the screwed coned member 32a. Also leading out of pressure chamber 30 is, in this embodiment, the pilot relief valve 33 which consists of a ball or other type of valve member 33a, spring 33b, loading screw 33c, and outlet ports 33d. Pressure chamber 30 leads into smooth bore chamber 34 in which is located a floating piston 35, which piston also acts as a valve member by co-operating with ports 34a, formed in the side of the bore. The lower end of chamber 34 is connected, by connection 36, into the main system, the pressure of which is to be regulated. In this embodiment ports 34a and piston 35 are so arranged that when the regulator is inoperative the upper ends of these ports are uncovered by piston 35, permitting any sludge which may have accumulated thereon to drain away. The upper surface of piston 35 is coned or otherwise shaped in order to facilitate removal of sludge. The pilot pump intake is connected to the main system.

Such a system might be the lubrication circuit of an internal combustion engine. In such a case connection 36 is connected to the engine lubricant gallery either directly or by means of a convenient conduit. The regulator would act as an oil relief valve, replacing the spring-loaded relief valve or valves normally fitted. The regulator would be fixed within the engine enclosure. The suction side of the pilot pump is connected into the oil gallery or to a point in the system adjacent thereto and would deliver into entry 31.

The regulator and the pilot circuit are so arranged as to ensure that the temperature of the oil passing through orifice 32 shall be substantially equal to that of the oil in the engine gallery. The pilot pump can be driven directly by the engine or independently by a suitable means if preferred. When the engine runs at normal speed and temperature, the main oil pump delivers a supply of oil into the engine gallery in excess of the full lubricating, cushioning and cooling requirements. Floating piston 35 is forced upwards allowing an overflow from the main stream to sump to take place through ports 34a. Concurrently owing to the flow-restricting effect of orifice 32 an hydraulic pressure is built up in a chamber 34 which exerts a force on piston 35 causing this member to close ports 34a to the degree necessary to produce a state of equilibrium in which gallery and pilot circuit pressures are balanced. This pressure is regulable by adjustment of orifice 32 by means of coned member 32a. With a warm engine 32a would be adjusted to produce a gallery oil pressure capable of causing a full normal oil supply to flow to all bearings, which supply would be maintained under all conditions of temperature and viscosity so long as relief valve 33 does not operate.

When starting from cold the pressure necessary to produce the full normal flow of oil would be very considerable. Such a pressure is neither desirable nor necessary. Relief valve 33 is regulable by means of screw 33c, and limits pilot circuit, and therefore gallery, pressure to a magnitude sufficient to cause a satisfactory minimum flow of oil to all bearings under coldest starting conditions. Whilst the engine and oil warm up this pressure is maintained, the rate of flow to all bearings meanwhile increasing, until the viscosity is such that the whole of the pilot pump output can pass through orifice 32. At this point full normal flow to the bearings has been established; relief valve 33 closes and the gallery oil pressure is regulated in sympathy with the falling viscosity of the lubricant, the rate of flow through the engine remaining substantially uniform.

It will be evident that, in this application, cold oil pressures and rates of flow are regulable by screw 33c, whereas pressure and rate of flow in a warm engine are controlled by the adjustment of valve member 32a.

The details of construction may be varied in many ways without departing from the scope of the invention.

What I claim and desire to secure by Letters Patent is:

1. A viscosity-responsive pressure regulating valve for use in an hydraulic system; said pressure regulating valve comprising a pressure chamber having an inlet for receiving a stream of fluid and an outlet for discharging the said fluid from said chamber, adjustable means for restricting the flow of fluid through said outlet thereby developing in the pressure chamber a fluid pressure proportional to viscosity, a piston chamber of uniform diameter in communication at one end with said pressure chamber, said piston chamber having an inlet port at its other end for receiving fluid under pressure from the system to be regulated and an outlet port intermediate its ends, and a floating piston of uniform diameter slidably fitted in said piston chamber for controlling flow of fluid from said piston chamber inlet port through said intermediate outlet port in accordance with the balanced fluid pressures exerted upon the opposite ends of said floating piston; said piston being movable by pressure fluid introduced through said piston chamber inlet port to close communication between said intermediate outlet port and said pressure chamber.

2. A viscosity-responsive pressure regulating valve as recited in claim 1, in which the floating piston has an outwardly coned end facing said pressure chamber to facilitate the removal of sludge.

3. A viscosity-responsive pressure regulating valve as recited in claim 1, in which said adjustable means for restricting the flow of fluid through said outlet from said pressure chamber is a screwed conical member.

4. A viscosity-responsive pressure regulating valve for use in a hydraulic system; said pressure regulating valve comprising a pressure chamber, an inlet port for said chamber for receiving a stream of fluid, said chamber having an outlet port for discharging said fluid from said pressure chamber, adjustable means for restricting the fluid flow through said outlet port, thereby developing in the pressure chamber a fluid pressure proportional to viscosity a vertically arranged cylindrical piston chamber having its upper end in communication with said pressure chamber, an inlet port at the lower end of said chamber for receiving a pressure fluid from the system to be regulated, an outlet port intermediate the ends of said piston chamber, and a floating piston slidably fitted in said piston chamber for controlling fluid discharge through said intermediate outlet port from said piston chamber inlet port by virtue of the pressure generated within the pressure chamber balancing pressure at which discharge takes place from the piston chamber through said intermediate outlet port.

5. In combination with a pilot pump circuit and a main circuit under pressure in an hydraulic system, a viscosity-responsive pressure regulating valve comprising a pressure chamber having an inlet in communication with the pilot circuit and having an outlet port leading from said pressure chamber, adjustable means for restricting the flow of fluid from said outlet port thereby developing in said pressure chamber a fluid pressure proportional to viscosity, a piston chamber of uniform diameter in communication at one end with the pressure chamber, said piston chamber having an inlet port at its other end in communication with said main circuit and having an outlet port intermediate the ends of said piston chamber, and a floating piston of uniform diameter slidably fitted in said piston chamber and constructed and arranged to control flow of main fluid from said piston chamber inlet port through said intermediate outlet port.

CECIL CYPRIAN HIGGENS.

REFERENCES CITED

The following references are of record in the file of this patent:

UNITED STATES PATENTS

| Number | Name | Date |
|---|---|---|
| 2,051,299 | Howell | Aug. 18, 1936 |
| 2,164,669 | Thomas | July 4, 1939 |
| 2,298,646 | Ovens | Oct. 13, 1942 |
| 2,359,017 | Balsiger | Sept. 26, 1944 |

FOREIGN PATENTS

| Number | Country | Date |
|---|---|---|
| 847,080 | France | June 26, 1939 |
| 101,583 | Sweden | May 13, 1941 |